United States Patent
Park et al.

(10) Patent No.: US 9,789,807 B2
(45) Date of Patent: Oct. 17, 2017

(54) LAMP FOR VEHICLE AND CONTROLLING METHOD THEREOF

(71) Applicant: SL Corporation, Daegu (KR)

(72) Inventors: Jong Ryoul Park, Gyeongbuk-Do (KR); Young Ho Son, Gyeongbuk-Do (KR); Dong Jin Ko, Gyeongbuk-Do (KR); Chang Woo Baek, Gyeongbuk-Do (KR)

(73) Assignee: SL Corporation, Daegu (KR)

( * ) Notice: Subject to any disclaimer, the term of this patent is extended or adjusted under 35 U.S.C. 154(b) by 210 days.

(21) Appl. No.: 14/805,974

(22) Filed: Jul. 22, 2015

(65) Prior Publication Data

US 2017/0043702 A1 Feb. 16, 2017

(30) Foreign Application Priority Data

Jul. 24, 2014 (KR) .......... 10-2014-0094008
Sep. 23, 2014 (KR) .......... 10-2014-0126933

(51) Int. Cl.
*B60Q 1/08* (2006.01)
*B60Q 1/14* (2006.01)
(Continued)

(52) U.S. Cl.
CPC ............ *B60Q 1/085* (2013.01); *B60Q 1/076* (2013.01); *B60Q 1/08* (2013.01); *B60Q 1/143* (2013.01); *F21S 48/1159* (2013.01); *F21S 48/1258* (2013.01); *F21S 48/1323* (2013.01); *F21S 48/1742* (2013.01); *F21S 48/1778* (2013.01); *F21S 48/1784* (2013.01); *B60Q 2200/30* (2013.01); *B60Q 2300/05* (2013.01); *B60Q 2300/056* (2013.01); *B60Q 2300/12* (2013.01);
(Continued)

(58) Field of Classification Search
CPC ........ B60Q 1/0085; B60Q 1/076; B60Q 1/08; B60Q 1/143; F21S 48/1742; F21S 48/1784; F21S 48/1159; F21S 48/1258; F21S 48/1323; F21S 48/1778
See application file for complete search history.

(56) References Cited

U.S. PATENT DOCUMENTS

2009/0279317 A1* 11/2009 Tatara .............. B60Q 1/12
362/465
2012/0271511 A1* 10/2012 Dierks .............. B60Q 1/143
701/36

FOREIGN PATENT DOCUMENTS

EP 2062775 A1 5/2009
JP 2011-175920 A 9/2011
(Continued)

*Primary Examiner* — David V Bruce
(74) *Attorney, Agent, or Firm* — Mintz Levin Cohn Ferris Glovsky and Popeo, P.C.; Kongsik Kim; Colleen H. Witherell

(57) ABSTRACT

A lamp includes a vehicle position sensing unit for sensing a position of a forward vehicle. The lamp includes a plurality of lamp units for changing beam patterns by opening or closing a portion of a shield having a plate shape, a shield actuating unit actuating the shield to open or close the portion of the shield and an optical axis adjustment unit for changing a direction of irradiation of light by adjusting an optical axis of at least one of the plurality of lamp units. In particular, a control unit forms a shadow zone by controlling at least one of the shield actuating unit and the optical axis adjustment unit according to the sensed position of the forward vehicle.

18 Claims, 28 Drawing Sheets

(51) Int. Cl.
*F21S 8/10* (2006.01)
*B60Q 1/076* (2006.01)
(52) U.S. Cl.
CPC ...... *B60Q 2300/41* (2013.01); *B60Q 2300/42* (2013.01)

(56) References Cited

FOREIGN PATENT DOCUMENTS

| | | | |
|---|---|---|---|
| JP | 2011238378 A | 11/2011 | |
| KR | 1998-041577 | 9/1998 | |

\* cited by examiner

LAMP FOR VEHICLE AND CONTROLLING METHOD THEREOF

CROSS-REFERENCE TO RELATED APPLICATIONS

This application claims priority to Korean Application No. 10-2014-0126933 filed Sep. 23, 2014 and Korean Application No. 10-2014-0094008 filed Jul. 24, 2014, which applications are incorporated herein by reference in its entirety.

BACKGROUND

1. Field of the Invention

The invention relates to a lamp for a vehicle and a controlling method thereof, and more particularly, to a lamp for a vehicle and a controlling method, capable of forming a shadow zone according to the position of a forward vehicle while securing a driver's field of view, and are also capable of preventing a splatter of light during the irradiation of a low-beam pattern.

2. Description of the Related Art

Typically, vehicles are equipped with various lamps for illuminating nearby objects for night-time driving or for signaling nearby vehicles or pedestrians regarding their state of driving. For example, headlamps and fog lamps are typically used for illuminating purposes, and turn signal lamps, tail lamps, brake lamps, and side marker lamps are customarily used for signaling purposes. Specification and installation criteria for automotive lamps are regulated to ensure that the automotive lamps properly perform their intended functions. For example, headlamps, which form a low or a high beam pattern providing a driver's front field of view during nighttime driving, play an important role for safe driving.

In accordance with a heightened demand for safe driving features, a method is required to secure a driver's field of view without interfering with the field of view of the driver of a preceding or oncoming vehicle considering that driving with the headlamps on may cause significant glare to the driver of the preceding vehicle or the oncoming vehicle and thus increases the likelihood of an accident.

The above information disclosed in this section is merely for enhancement of understanding of the background of the invention and therefore it may contain information that does not form the prior art that is already known in this country to a person of ordinary skill in the art.

SUMMARY

Exemplary embodiments provide a lamp for a vehicle and a controlling method thereof, which may form a shadow zone by changing beam patterns or changing a direction of irradiation of light through the opening or closing of a portion of a shield. Exemplary embodiments may further provide a lamp for a vehicle and a controlling method that may form a clear shadow zone by forming a portion of a shield to be opened or closed to be asymmetrical with respect to the center line of the shield.

In one aspect, a lamp for a vehicle and a controlling method thereof, may prevent glare to the driver of a preceding or oncoming vehicle and may contribute to safe driving by preventing glare to the driver of a preceding or oncoming vehicle that may be caused by a splatter of light during the change of beam patterns to a low beam pattern through the opening or closing of a portion of a shield.

However, exemplary embodiments of the invention are not restricted to those set forth herein.

According to another aspect, a lamp for a vehicle may include a vehicle position sensing unit that may sense a position of a forward vehicle, and a plurality of lamp units that may change beam patterns by opening or closing a portion of a shield thereof, which may be plate-shaped. A shield actuating unit may actuate the shield to open or close the portion of the shield. An optical axis adjustment unit may change a direction of irradiation of light by adjusting an optical axis of at least one of the plurality of lamp units and a control unit may form a shadow zone by controlling at least one of the shield actuating unit and the optical axis adjustment unit according to the sensed position of the forward vehicle.

According to another aspect, a lamp for a vehicle may include a plurality of light-emitting units that may be disposed in different directions from an optical axis and a lens that may be disposed at the front of the plurality of light-emitting units and transmitting light therethrough. A shield may include a fixed shield, fixedly installed in a predetermined area between the plurality of light-emitting units and the lens, and a movable shield, that may selectively open or close an incised groove formed at the front of the fixed shield.

In another aspect, a controlling method of a lamp for a vehicle may include forming a low beam pattern and a beam pattern for a long-range visibility with the use of a plurality of lamp units. For example, each of the plurality of lamp units may include a shield having a portion to be opened or closed and sensing a position of a forward vehicle. A shadow zone may be formed by closing the portion of the shield or changing a direction of irradiation of light of at least one of the plurality of lamp units according to the sensed position of the forward vehicle. In particular, it may be possible to form a shadow zone by changing beam patterns or a direction of irradiation of light through the opening or closing of a portion of a shield, and thus to prevent glare to the driver of a forward vehicle. Furthermore, it may be possible to prevent a splatter of light during the change of beam patterns to a low beam pattern through the opening or closing of a portion of a shield. Moreover, it may be possible to prevent glare to the driver of a preceding or oncoming vehicle and thus to contribute to safe driving.

Other features and exemplary embodiments will be apparent from the following detailed description, the drawings, and the claims.

BRIEF DESCRIPTION OF THE DRAWINGS

The above and other features and advantages of the present disclosure will be more apparent from the following detailed description taken in conjunction with the accompanying drawings.

DETAILED DESCRIPTION

Figure 1:
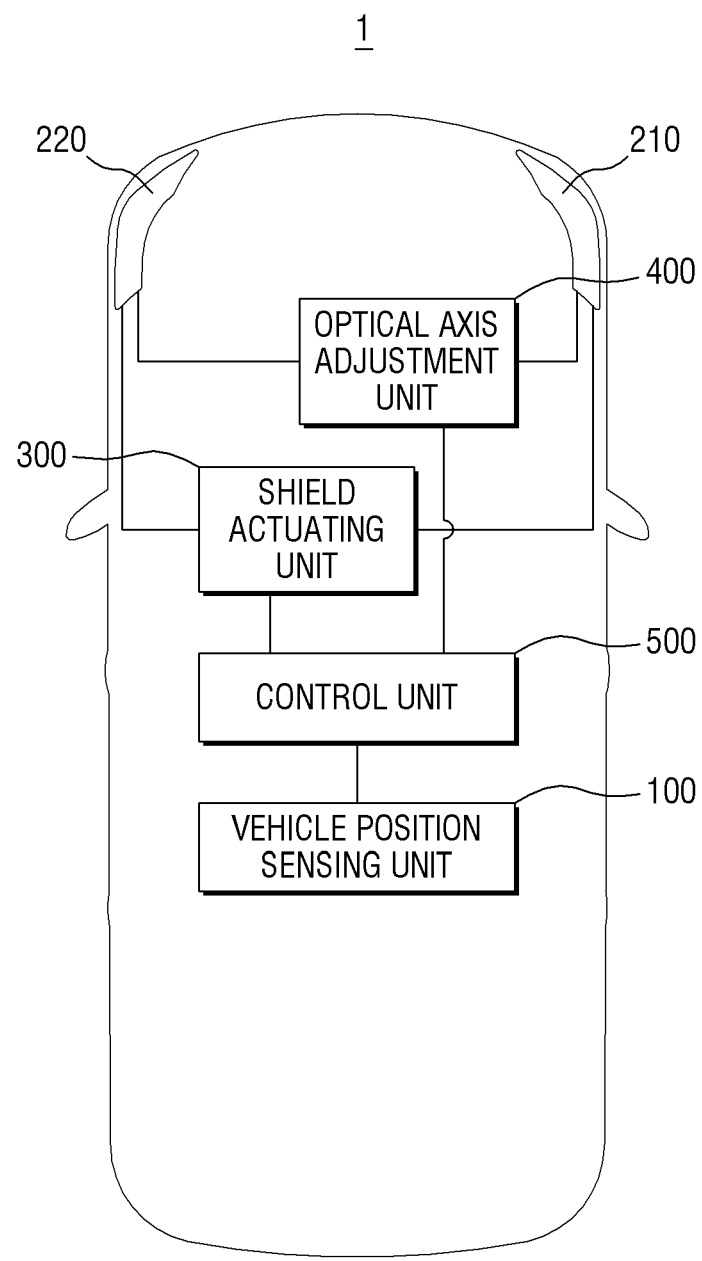
FIG. 1 is a schematic view illustrating a lamp for a vehicle, according to an exemplary embodiment of the invention.

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. On the contrary, the invention is intended to cover not only the exemplary embodiments, but also various alternatives, modifications, equivalents and other embodiments, which may be included within the spirit and scope of the invention as defined by the appended claims. Like reference numerals refer to like elements throughout the specification.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises (includes)" and/or "comprising (including)," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, In order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as a non-transitory computer readable media on a computer readable medium containing executable program instructions executed by a processor, controller/control unit or the like. Examples of the computer readable mediums include, but are not limited to, ROM, RAM, Compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Additionally, exemplary embodiments in the description that follows will be described with reference to sectional views and/or plan views as ideal exemplary views of the invention. In the drawings, the dimensions of layers and regions are exaggerated for clarity of illustration. Accordingly, shapes illustrated in the exemplary views may be modified according to manufacturing techniques and/or allowable errors. Therefore, exemplary embodiments of the invention are not limited to the shapes illustrated in the exemplary views, but may include other shapes that may be created according to manufacturing processes.

FIG. 1 is a schematic view illustrating a lamp for a vehicle, according to an exemplary embodiment. Referring to FIG. 1, a lamp 1 for a vehicle may include a vehicle position sensing unit 100, a plurality of lamp units 210 and 220, a shield actuating unit 300, an optical axis adjustment unit 400 and a control unit 500. The vehicle position sensing unit 100 may sense the position of a forward vehicle such as a preceding vehicle or an oncoming vehicle. The vehicle position sensing unit 100 may sense the position of the forward vehicle based on an image captured by, for example, an imaging device (e.g., a camera, video camera or the like) provided within a vehicle. For example, the vehicle position sensing unit 100 may sense the position or the location of the forward vehicle or the distance from the forward vehicle by determining the wavelength or width of light generated by headlamps or tail lamps of the forward vehicle or the location of the centerline or the edges of the road. Further, a distance sensing sensor (e.g., an ultrasonic sensor or an infrared sensor) for sensing the distance from the forward vehicle may be provided.

The plurality of lamp units 210 and 220 may irradiate light to secure a driver's field of view (e.g. vision) when driving during nighttime or driving through a dark area (e.g. tunnel). For example, the plurality of lamp units 210 and 220 may be two headlamps disposed or positioned on either front side of a vehicle. The plurality of lamp units 210 and 220 may form various beam patterns such as low or high beam patterns depending on a state of driving of the vehicle or the surrounding environment of the vehicle.

In the exemplary embodiment of FIG. 1, the plurality of lamp units 210 and 220 may include headlamps. In other words, the plurality of lamp units 210 and 220 may be various other lamps installed in a vehicle, such as tail lamps, brake lamps, fog lamps, turn signal lamps, or position lamps. The exemplary embodiment of FIG. 1 will be further described, assuming that the plurality of lamp units 210 and 220 include first and second lamp units 210 and 220, which are right and left headlamp, respectively, with respect to the traveling direction of the vehicle.

Figure 2:
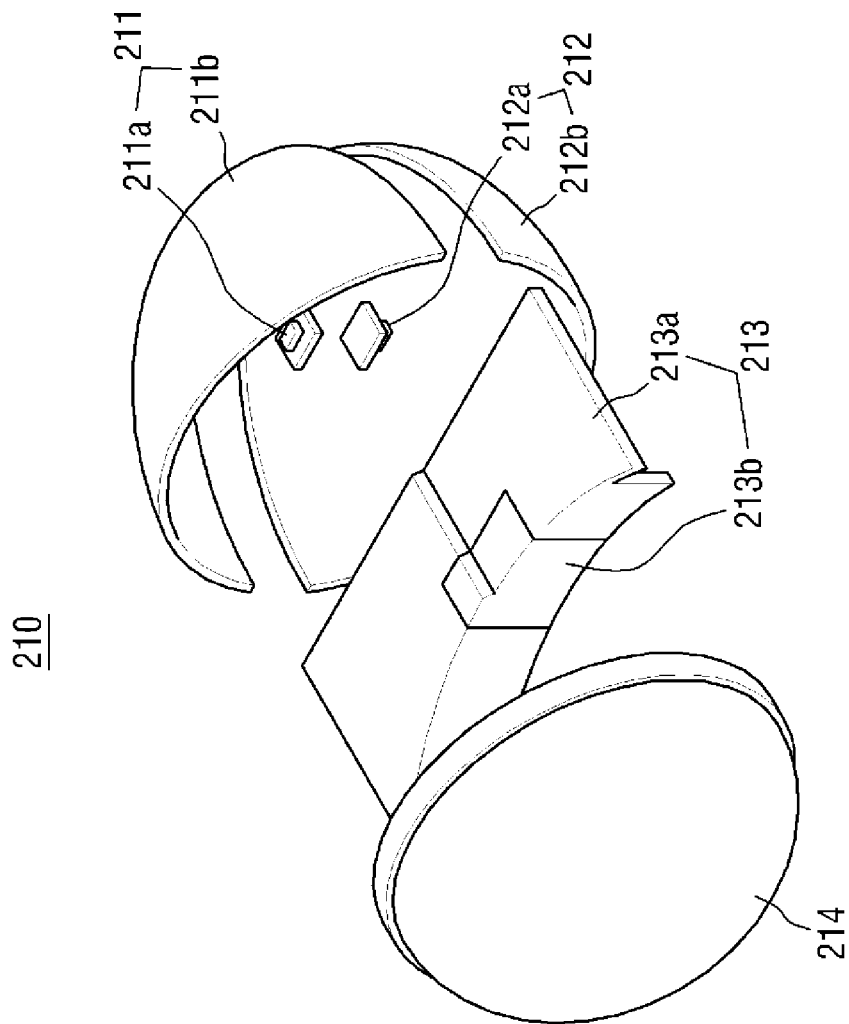
FIG. 2 is an exemplary embodiment of a perspective view illustrating a first lamp unit that can be applied to the lamp according to the exemplary embodiment of FIG. 1.
Figure 3:
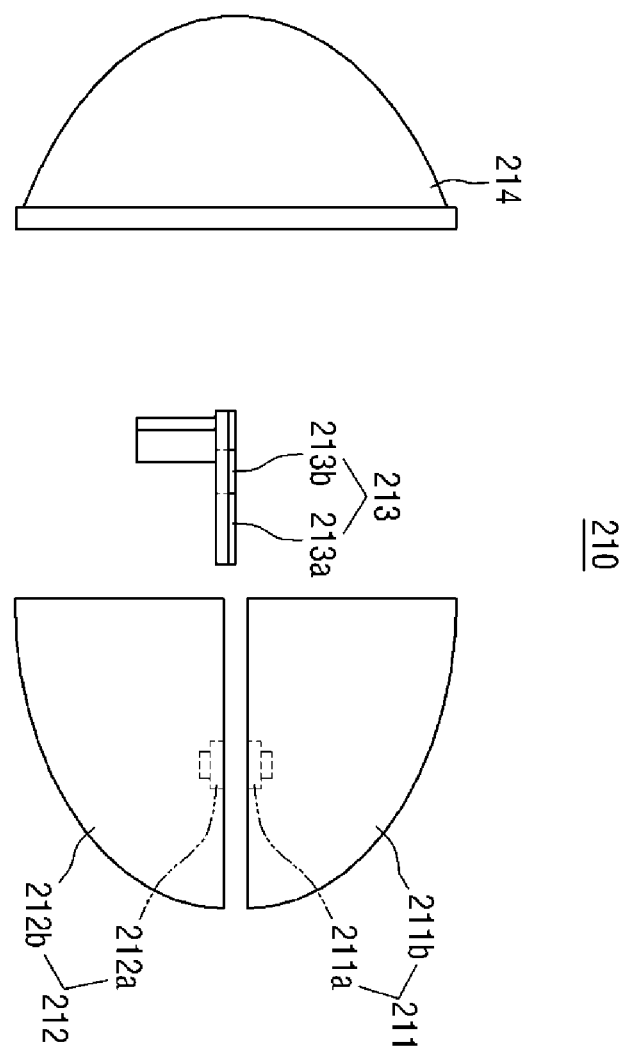
FIG. 3 is an exemplary embodiment of a side view illustrating the first lamp unit of FIG. 2.

FIG. 2 is an exemplary embodiment of a perspective view illustrating a first lamp unit that can be applied to the lamp according to the exemplary embodiment of FIG. 1. FIG. 3 is an exemplary embodiment of a side view illustrating the first lamp unit of FIG. 2. FIGS. 2 and 3 illustrate an example of the first lamp unit 210, the second lamp unit 220 may have a similar structure to the first lamp unit 210. Referring to FIGS. 2 and 3, the first lamp unit 210 may include a plurality of light-emitting units 211 and 212, a shield 213 and a lens 214. The plurality of light-emitting units 211 and 212 may be disposed in plurality of directions from an optical axis of the lens 214. For example, the plurality of light-emitting units 211 and 212 may be disposed in an upper-side direction and a lower-side direction from the lens 214, and light may be generated by at least one of the plurality of light-emitting units 211 and 212 depending on the type of a beam pattern to be formed.

For example, forming a low beam pattern may require, light generated by the light-emitting unit 211, which may be disposed above the optical axis of the lens 214. Conversely forming a high beam pattern, may require light to be generated by the plurality of light-emitting units 211 and 212. Furthermore, light may be generated by the light-emitting units 211 and 212 regardless of the type of a beam pattern to be formed. Additionally, the light-emitting units 211 and 212 may be configured to form different beam patterns or one of the light-emitting units 211 and 212 may be configured to form a beam pattern that reinforces part of a beam pattern formed by the other light-emitting unit(s). The light-emitting units 211 and 212 may include light sources 211a and 212a, respectively, and reflectors 211b and 212b, respectively. The reflectors 211b and 212b may be disposed such that the reflective surfaces within the interior of the reflectors 211b and 212b may respectively face the light-emitting surfaces of the light sources 211a and 212a.

The shield 213 may have the shape of a plate, may be disposed at the front of, and between, the plurality of light-emitting units 211 and 212, and may form a beam pattern by obstructing a portion of the light generated by at least one of the plurality of light-emitting units 211 and 212. The shield 213 may have a curved shape contoured toward the sides of the lens 214 along the rear focal plane of the lens 214. In order to form a cut-off line in a beam pattern, the shield 213 may be formed to have a stepped portion on at least part of a surface thereof that obstructs a portion of the light generated by at least one of the plurality of light-emitting units 211 and 212.

A reflective layer (not illustrated) may be formed on the surface of the shield 213 obstructing a portion of the light generated by the plurality of light-emitting units 211 and 212, to reflect the obstructed light to travel toward the lens 214. The reflective layer may be formed by a deposition process. For example, in response to the shield 213 being formed in the shape of a plate, the reflective layer may be formed on a top surface of the shield 213 such that light obstructed by the top surface of the shield 213 may be reflected toward an upper part of the lens 214, and may be used to improve a low beam pattern's field of view for a near-range visibility. The shield 213 may include a fixed shield 213a (e.g., a first region) and a movable shield 213b (e.g., a second region). The fixed shield 213a may have a fixed location, and the movable shield 213b may be actuated to open or close a portion of the shield 213b. The second region of the shield 213 may be formed to extend from the center of the front of the shield 213 to the rear of the shield 213.

Figure 4:
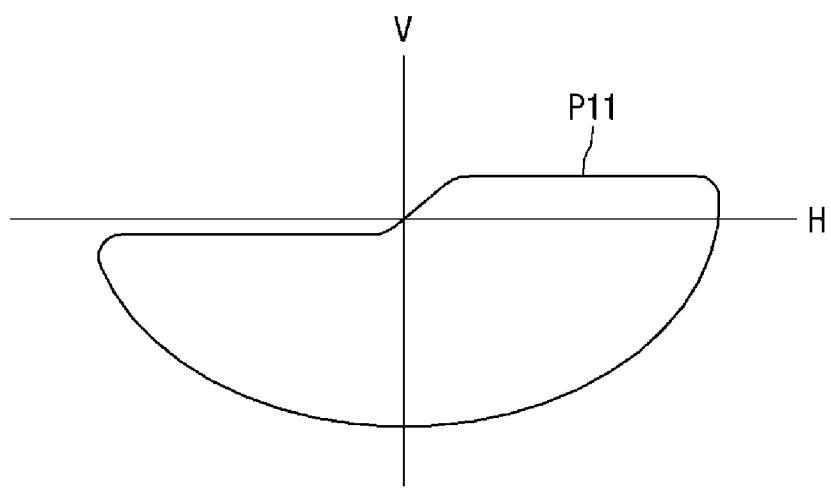
FIG. 4 is an exemplary embodiment of a schematic view illustrating a low beam pattern formed by the first lamp unit of FIG. 2.
Figure 5:
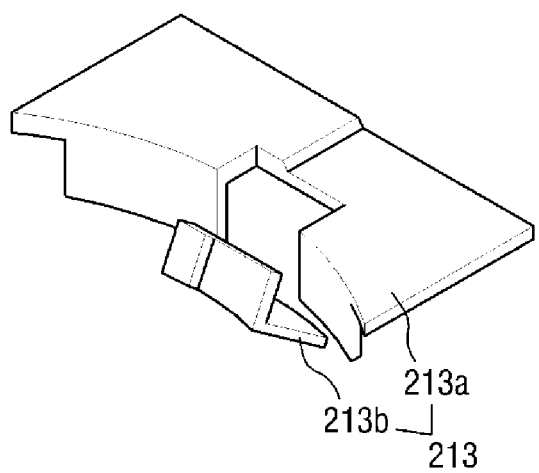
FIG. 5 is an exemplary embodiment of a perspective view illustrating a movable shield actuated by the first lamp unit of FIG. 2.

As illustrated in FIG. 4, in response to the second region of the shield 213 being closed by the movable shield 213b, the shield 213 may form a low beam pattern P11. As illustrated in FIG. 5, when the movable shield 213b is actuated to open the second region of the shield 213, a beam pattern P12 for a long-range visibility may be formed by the second region of the shield 213. As further illustrated in FIG. 6, a high beam pattern P13 may be formed together with the low beam pattern P11.

Figure 6:
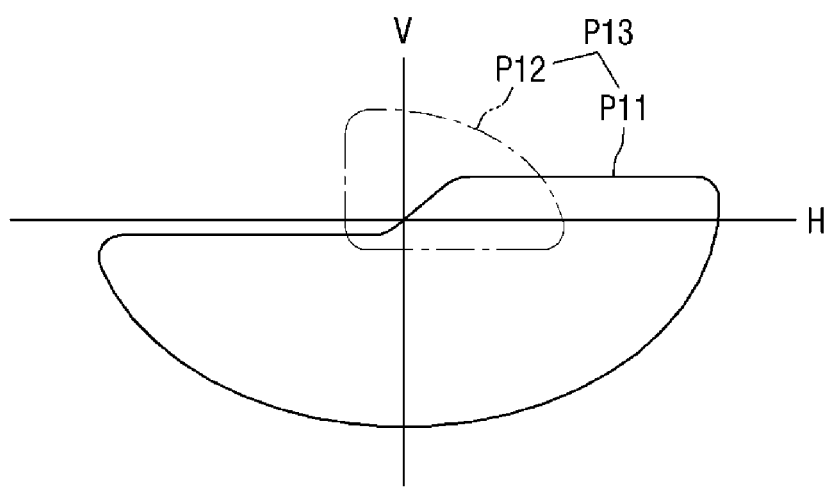
FIG. 6 is an exemplary embodiment of a schematic view illustrating a high beam pattern formed by the first lamp unit of FIG. 2.

Referring to FIG. 6, the beam pattern P12 may have a portion corresponding to a direction of the interior of the vehicle removed because the second region of the first lamp unit 210 may be asymmetrical with respect to the centerline of the shield 213. Additionally, a high beam pattern may be formed by combining a beam pattern formed by the first lamp unit 210 and a beam pattern formed by the second lamp unit 220, and a shadow zone may be formed according to the position of a forward vehicle. A shadow zone will be described later in detail.

Figure 7:
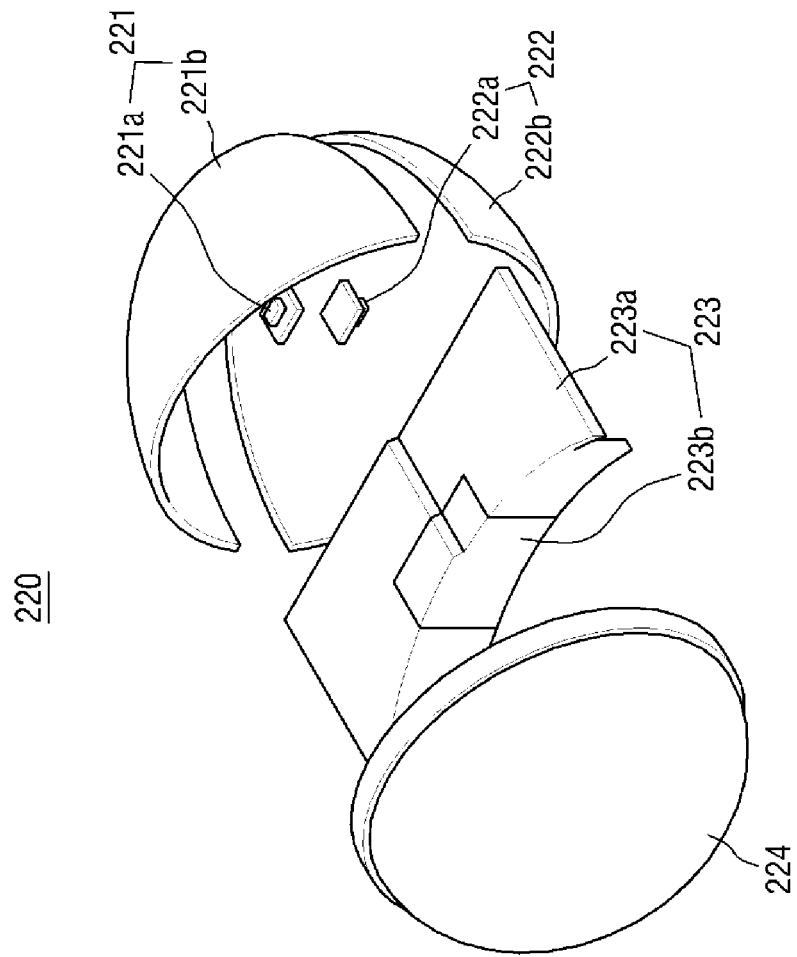
FIG. 7 is an exemplary embodiment of a perspective view illustrating a second lamp unit that can be applied to the lamp according to the exemplary embodiment of FIG. 1.

As illustrated in FIG. 7, similar to the first lamp unit 210, the second lamp unit 220 may include a plurality of light-emitting units 221 and 222, a shield 223 and a lens 224. The plurality of light-emitting units 221 and 222 may include light sources 221a and 222a, respectively. The light-emitting units 221 and 222 may further include reflectors 221b and 222b, respectively. Similar to the shield 213 of the first lamp unit 210, the shield 223 may include a fixed shield 223a, that may form a first region, and a movable shield 223b, that may form a second region.

Figure 8:
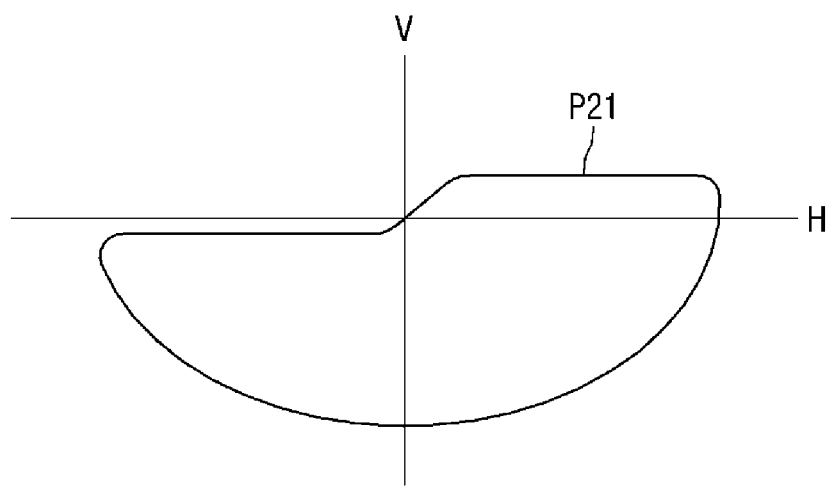
FIG. 8 is an exemplary embodiment of a schematic view illustrating a low beam pattern formed by the second lamp unit of FIG. 7.
Figure 9:
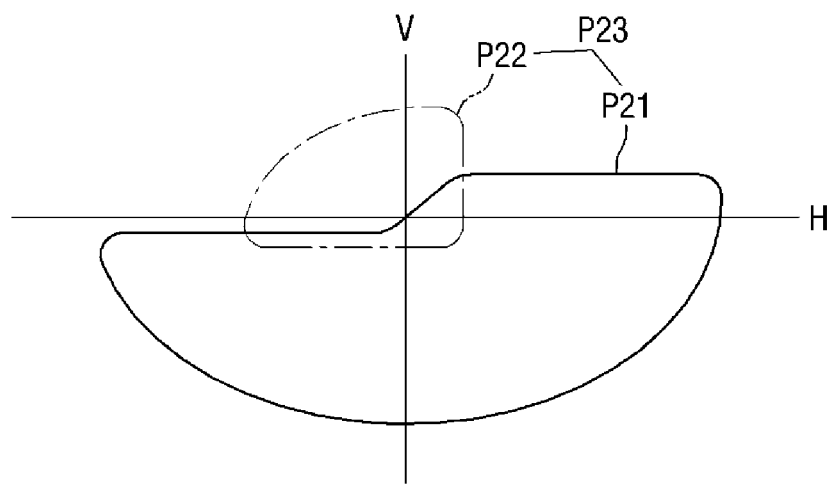
FIG. 9 is an exemplary embodiment of a schematic view illustrating a high beam pattern formed by the second lamp unit of FIG. 7.
Figure 10:
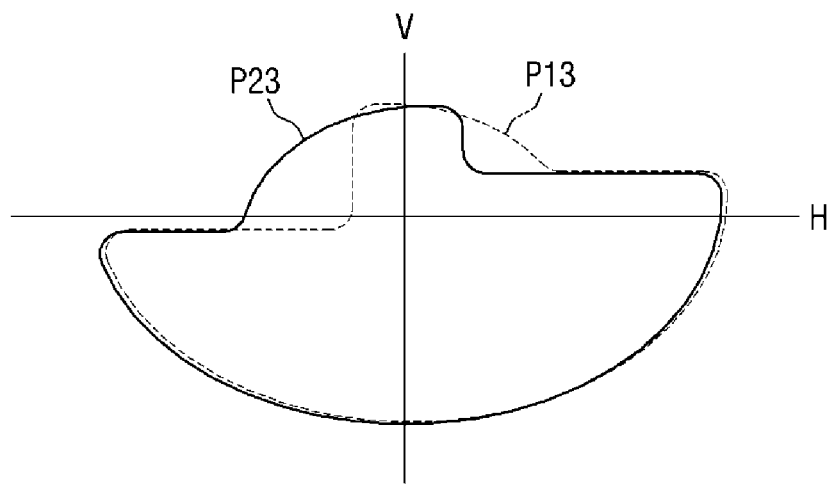
FIG. 10 is an exemplary embodiment of a schematic view illustrating a high beam pattern formed by the first lamp unit of FIG. 2 and the second lamp unit of FIG. 7 together.

In particular when the second region of the shield 223 is disposed in a closed position, the second lamp unit 220 may form a low beam pattern P21, as illustrated in FIG. 8. As illustrated in FIG. 9 in an alternate exemplary embodiment, when the movable shield 223b is actuated to open the second region of the shield 223, a beam pattern P22 for a long-range visibility may be formed by the second region of the shield 223, and may form a high beam pattern P23 together with the low beam pattern P21. The second region of the second lamp unit 220 may be asymmetrical with respect to the center line of the shield 223, and may be in symmetry with the second region of the first lamp unit 210. Additionally, the beam pattern P22 formed by the second lamp unit 220 may have a portion corresponding to the direction of the interior of the vehicle removed, and the removed part of the beam pattern P22 may be positioned on the opposite side of the removed part of the beam pattern P12 formed by the first lamp unit 210. As illustrated in FIG. 10, the beam pattern of FIG. 6 and the beam pattern of FIG. 8 may be combined together, thereby forming a high beam pattern P. In particular, the beam patterns P12 and P22 formed by the first and second lamp units 210 and 220, respectively, may partially overlap each other in the middle of the high beam pattern P.

The shield actuating unit 300 may include an actuator, which actuates the movable shield 213b. The rotation axis of the movable shield 213b may be directly or indirectly connected to the shield actuating unit 300. In other words, in response to the shield actuating unit 300 being driven, the movable shield 213b may be rotated to open or close the second region of the shield 213. In the exemplary embodiment of FIG. 1, the second region of the shield 213 may extend from the center portion of the front of the shield 213 to the rear of the shield 213. Additionally, the movable shield 213b may be rotated toward the front of the shield 213 to open or close the second region of the shield 213. In an alternate exemplary embodiment, a direction of the rotation of the movable shield 213b may vary depending on a direction in which the second region of the shield 213 is formed.

The optical axis adjustment unit 400 may change a direction of irradiation of light by adjusting the optical axis of at least one of the plurality of lamp units 210 and 220. For example, the optical axis adjustment unit 400 may rotate at least one of the plurality of lamp units 210 and 220 in a widthwise direction of the vehicle. The rotation of the plurality of lamps may thus change the direction of irradiation of light. For example, the optical axis adjustment unit 400 may include an actuator, coupled to the optical axis of at least one of the plurality of lamp units 210 and 220, and may change the direction of irradiation of light according to a direction of rotation of the actuator. The optical axis adjustment unit 400 may be provided for each of the plurality of lamp units 210 and 220 separately or for all the plurality of lamp units 210 and 220.

In the exemplary embodiment of FIG. 1, the optical axis adjustment unit 400 may rotate at least one of the plurality of lamp units 210 and 220 in the widthwise direction of the vehicle, (e.g., a horizontal direction). In other words, the optical axis adjustment unit 400 may rotate at least one of the plurality of lamp units 210 and 220 in a vertical direction or in a direction corresponding to a combination of the horizontal direction and the vertical direction.

The control unit 500 may form a shadow zone by controlling at least one of the shield actuating unit 300 and the optical axis adjustment unit 400 according to the position of a forward vehicle sensed by the vehicle position sensing unit 100. In other words, the control unit 500 may control at least one of the shield actuating unit 300 and the optical axis adjustment unit 400 according to the position of the sensed forward vehicle thereby preventing glare to the driver of the sensed forward vehicle. Furthermore, a shadow zone may prevent light from being irradiated onto a region corresponding to the position of the sensed forward vehicle.

Figure 11:
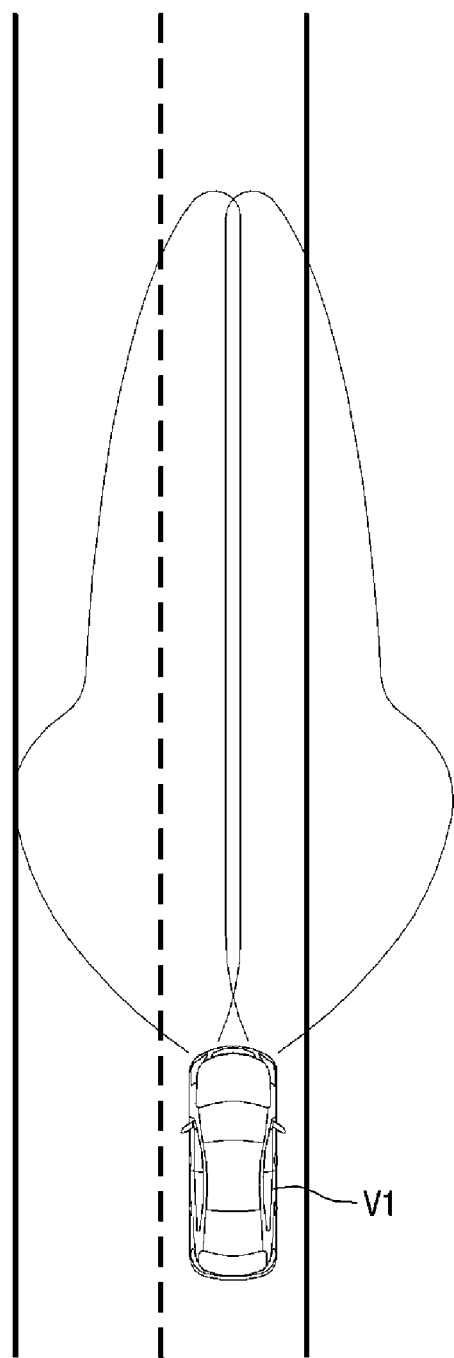
FIG. 11 is an exemplary embodiment of a schematic view illustrating a road surface beam pattern corresponding to the high beam pattern formed by the first lamp unit of FIG. 2 and the second lamp unit of FIG. 7 together.

Moreover, in response to the absence of a forward vehicle ahead of the vehicle, (i.e., a vehicle V1), as illustrated in FIG. 11, the control unit 500 may form a regular high beam pattern. Conversely, as illustrated in an exemplary embodiment in FIG. 12, in response to the presence of a forward vehicle V2 ahead of the vehicle V1 within a predetermined angle θ from the centerline of the vehicle V1, or in response to the forward vehicle V2 being relatively distant from the vehicle V1, the control unit 500 may form a shadow zone by controlling the optical axis adjustment unit 400 to rotate at least one of the plurality of lamp units 210 and 220. As illustrated in an exemplary embodiment in FIG. 13, in response to the forward vehicle V2 being located outside the predetermined angle θ from the centerline of the vehicle V1, or in response to the forward vehicle V2 being within a relatively short range of the vehicle V1, the control unit 500 may form a shadow zone by controlling the shield actuating unit 300 to change beam patterns.

Figure 12:
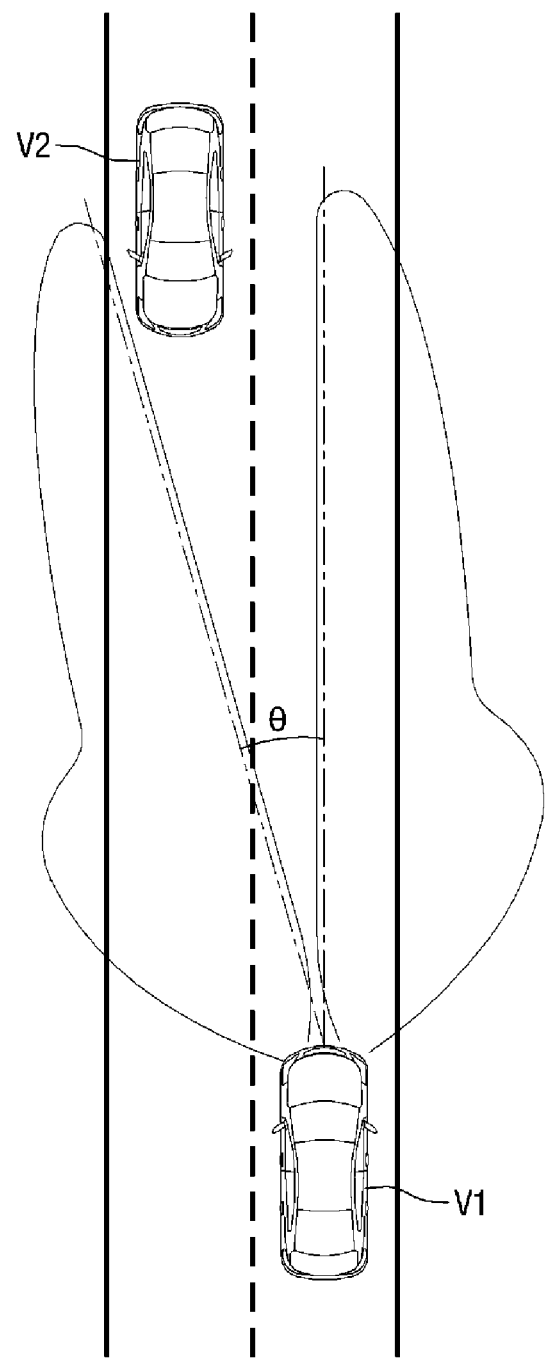
FIG. 12 is an exemplary embodiment of a schematic view illustrating a shadow zone formed by the rotation of a plurality of lamp units that can be applied to the lamp according to the exemplary embodiment of FIG. 1.
Figure 13:
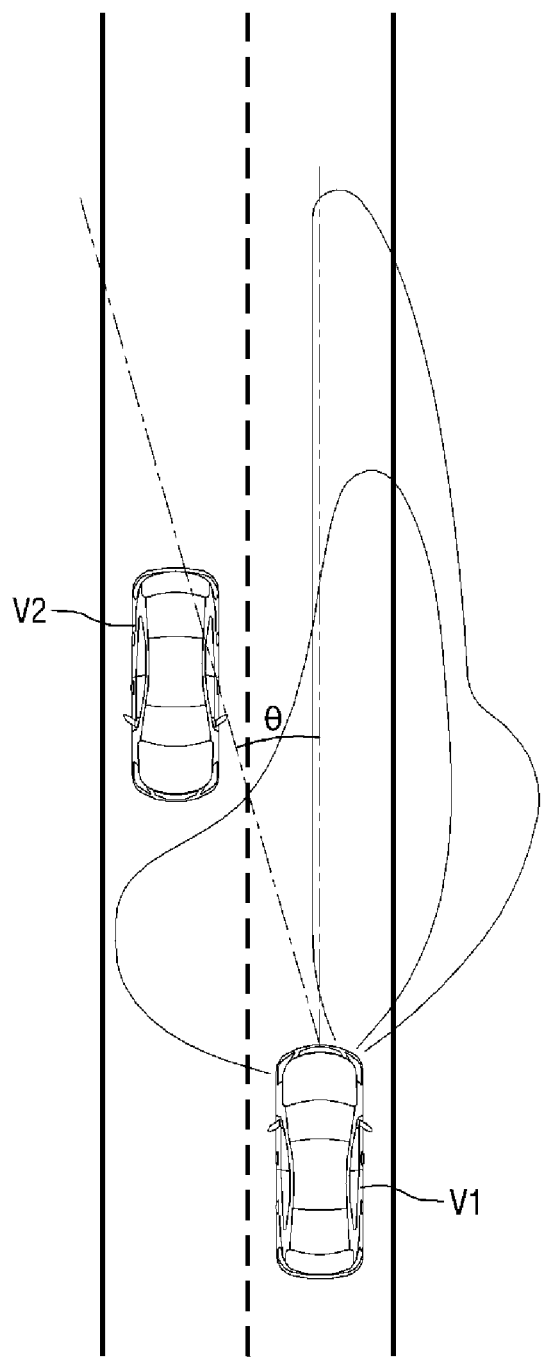
FIG. 13 is an exemplary embodiment of a schematic view illustrating a shadow zone formed by allowing the lamp according to the exemplary embodiment of FIG. 1 to change beam patterns.

In an alternate embodiment as illustrated in FIG. 12, in response to the forward vehicle V2 being relatively distant from the vehicle V1, the control unit 500 may control the optical axis adjustment unit 400 to rotate at least one of the plurality of lamp units 210 and 220, rather than controlling the shield actuating unit 300 to change beam patterns, because an optimum shadow zone can be formed for a distant forward vehicle only with a small angle of rotation of the plurality of lamp units 210 and 220. In other words a shadow zone formed by changing beam patterns may be excessive for a distant forward vehicle and may restrictively narrow the field of view of the driver of the distant forward vehicle. Additionally, the control unit 500 may control the optical axis adjustment unit 400, rather than the shield actuating unit 300, to form a shadow zone for a distant forward vehicle. Conversely, in response to the forward vehicle V2 being within a short range of the vehicle V1, as illustrated in FIG. 13, the control unit 500 may control the shield actuating unit 300 to adjust beam patterns because the forward vehicle V2 may be beyond the angle of rotation of the plurality of lamp units 210 and 220.

In the first embodiment, a shadow zone may be formed according to the position of a forward vehicle. In other words, a field of view may be secured by rotating at least one of the plurality of lamp units 210 and 220 corresponding to the traveling direction of the vehicle. The formation of a shadow zone in response to one forward vehicle ahead of the vehicle has been described with reference to FIGS. 12 and 13. In an alternate exemplary embodiment when there are multiple forward vehicles ahead of the vehicle, a shadow zone may be formed based on one of the forward vehicles positioned on the outermost left or right side of the vehicle.

Figure 14:
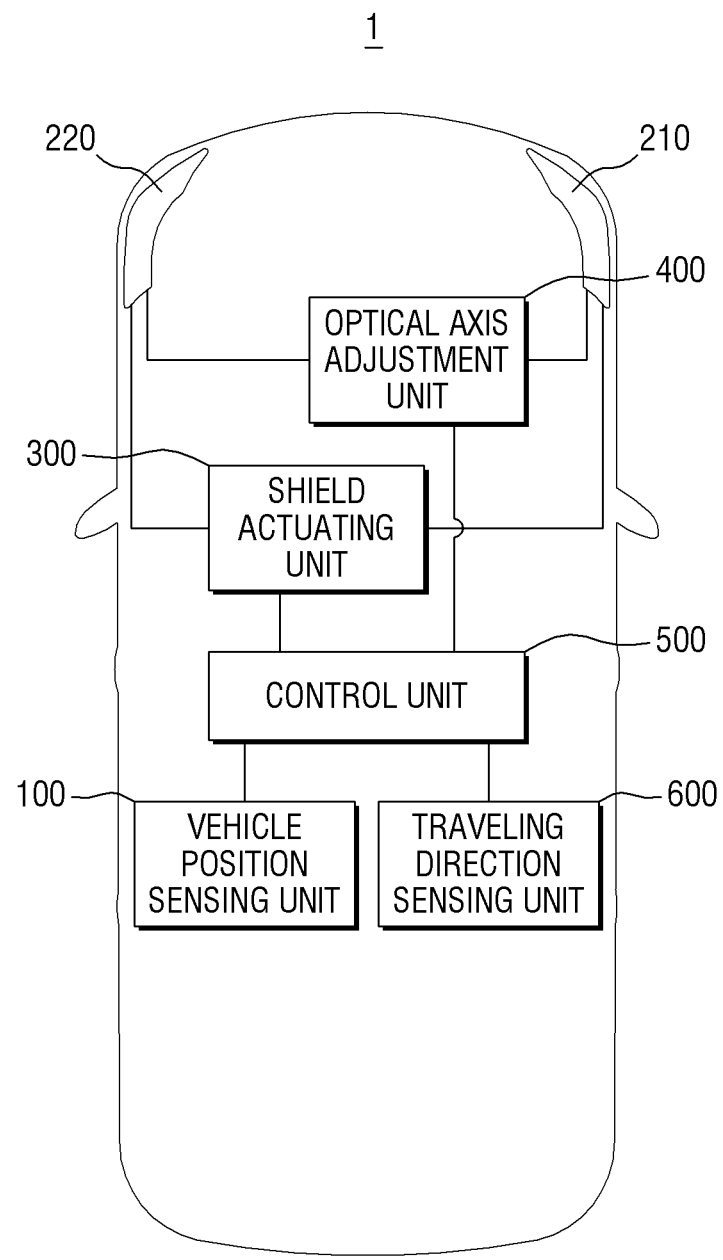
FIG. 14 is an exemplary embodiment of a schematic view illustrating a lamp for a vehicle, according to another exemplary embodiment of the invention.
Figure 15:
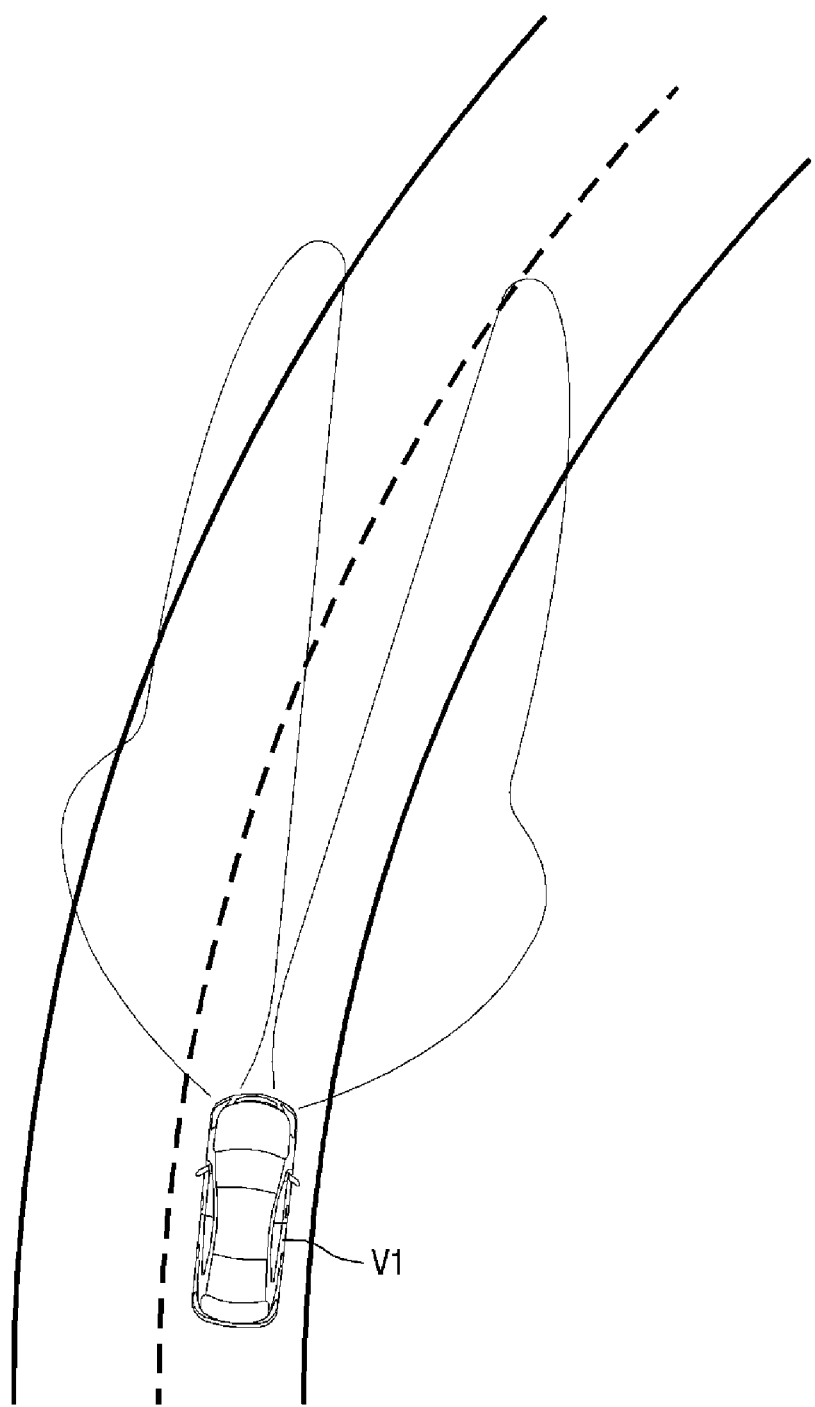
FIG. 15 is an exemplary embodiment of a schematic view illustrating a high beam pattern formed by allowing the lamp according to the exemplary embodiment of FIG. 14 to change a direction of irradiation of light upon the entrance of a curved road.

FIG. 14 is an exemplary embodiment of a schematic view illustrating a lamp for a vehicle, according to a second exemplary embodiment of the invention. A lamp 1 according to the exemplary embodiment of FIG. 14 has the same structure as the lamp 1 according to the exemplary embodiment of FIG. 1 and further includes a traveling direction sensing unit 600, which senses the traveling direction of a vehicle (hereinafter, the vehicle). Referring to FIG. 14, the traveling direction sensing unit 600 may sense the traveling direction of the vehicle based on the steering angle of the handle of the vehicle, a turn signal lamp signal, and the curvature of the road where the vehicle is travelling. Furthermore a control unit 500 may be configured to secure a field of view by rotating at least one of the plurality of lamp units 210 and 220 based on the sensed traveling direction of the vehicle. For example, as illustrated in FIG. 15, if light is irradiated to the front of the vehicle when the vehicle enters a curved road, a field of view may not be properly secured along a direction of the curved road, thereby increasing the likelihood of an accident. Additionally, the control unit 500 may be configured to control the optical axis adjustment unit 400 to rotate at least one of the plurality of lamp units 210 and 220 and may secure a field of view for the curved road. In the exemplary embodiment as shown in FIG. 15, one of the plurality of lamp units 210 and 220 may be rotated. In other words, the plurality of lamp units 210 and 220 may be rotated toward the traveling direction of the vehicle.

As described above, the lamp 1 according to the exemplary embodiment of FIG. 1 or 14 may form a shadow zone by changing beam patterns by opening or closing parts of the shields 213 and 223, and by rotating the plurality of lamp units 210 and 220. Additionally, a shadow zone may be formed with the use of a simple structure. Further, the lamp 1 according to the exemplary embodiment of FIG. 1 or 14 may secure a field of view by rotating at least one of the plurality of lamp units according to the traveling direction of the vehicle to change a direction of irradiation of light. In the exemplary embodiment of FIG. 1 or 14, the control unit 500 may be configured to control at least one of the shield actuating unit 300 and the optical axis adjustment unit 400 to form a shadow zone or change a direction of irradiation of light according to the traveling direction of the vehicle. In other words, the control unit 500 may be configured to control at least one of the shield actuating unit 300 and the optical axis adjustment unit 400 to form an optimum beam pattern according to the surroundings of the vehicle, including, the state of the road, the weather or the ambient brightness.

Figure 16:
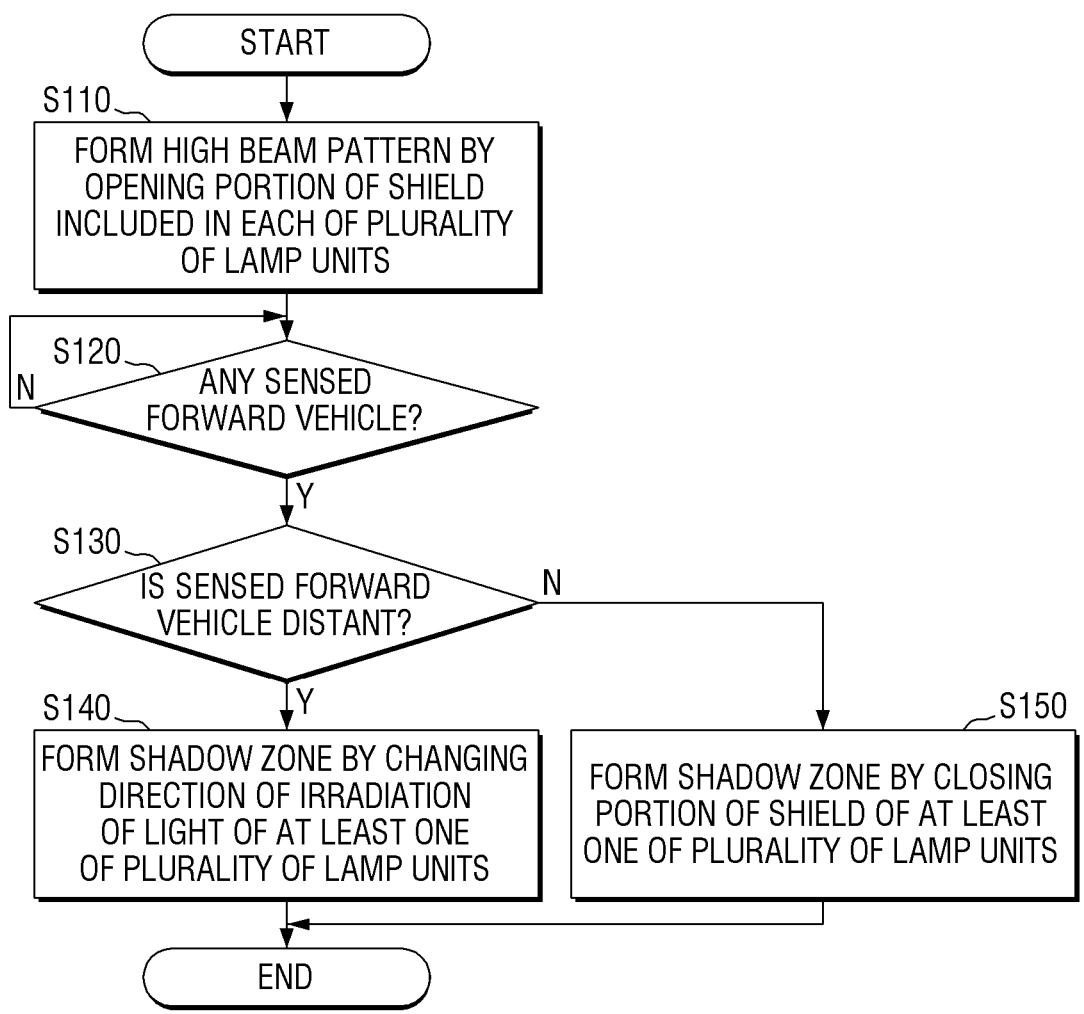
FIG. 16 is an exemplary embodiment of a flowchart illustrating a controlling method of a lamp for a vehicle, according to an exemplary embodiment of the invention.

FIG. 16 is an exemplary embodiment of a flowchart illustrating a controlling method of a lamp for a vehicle. In particular, FIG. 16 illustrates an example of forming a shadow zone according to the position of a forward vehicle when a high beam pattern has been previously formed. Referring to FIG. 16, a high beam pattern may be formed by opening parts of the shields 213 and 223 included in the plurality of lamp units 210 and 220, respectively (S110). The position of a forward vehicle may be sensed by the vehicle position sensing unit 100 (S120). In response to the position of the forward vehicle being sensed by the vehicle position sensing unit 100, the control unit 500 may be configured to determine whether the forward vehicle is at a distance from the vehicle (S130). In response to the forward vehicle being determined to be at a distance from the vehicle, (i.e., within a predetermined angle from the centerline of the vehicle), the control unit 500 may be configured to control the optical axis adjustment unit 400 to control at least one of the plurality of lamp units 210 and 220 thereby forming a shadow zone (S140). In the alternative, in response to the forward vehicle being determined to be within a short range of the vehicle, (i.e., beyond the predetermined angle from the centerline of the vehicle,) the control unit 500 may be configured to control the shield actuating unit 300 to close parts of the shields 213 and 223 included in the plurality of lamp units 210 and 220, respectively The high beam pattern may be changed to a low beam pattern and form a shadow zone accordingly (S150).

Figure 17:
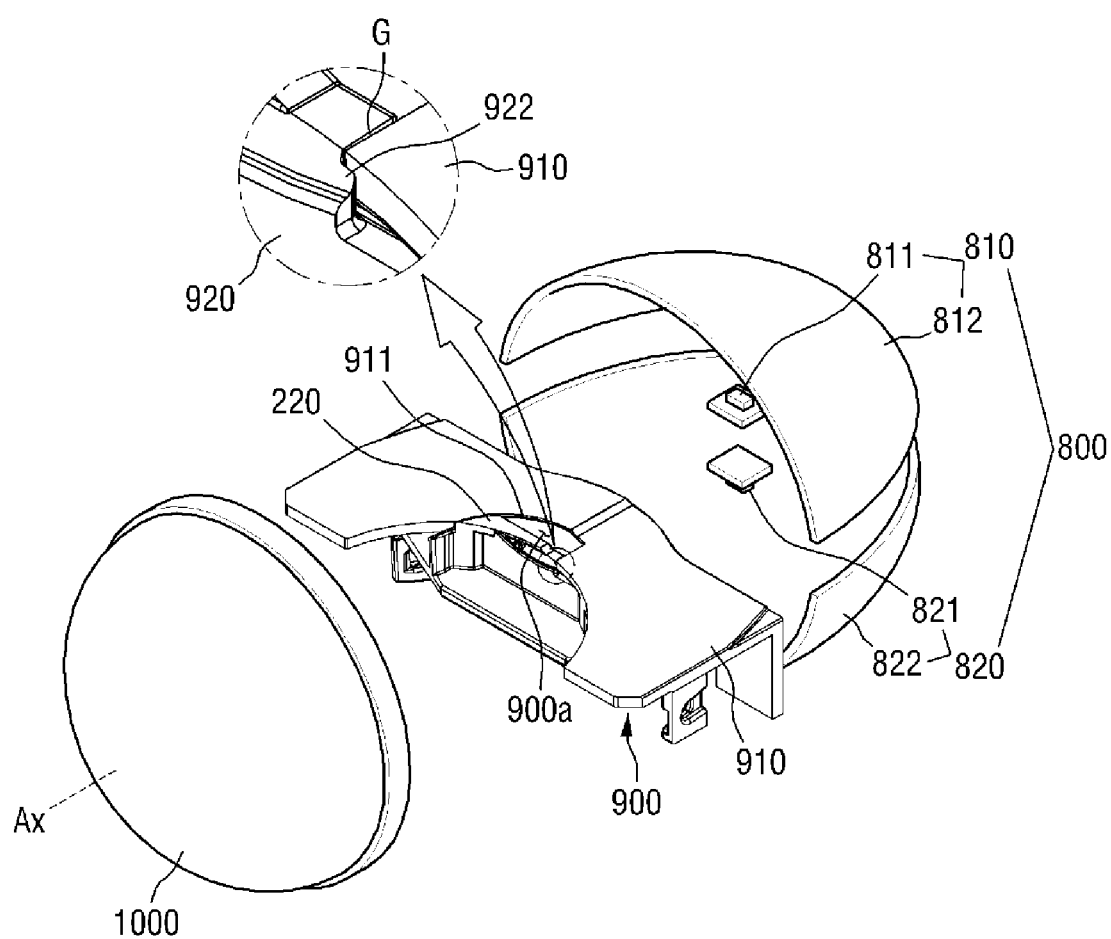
FIG. 17 is an exemplary embodiment of a perspective view illustrating another first lamp unit that can be applied to the lamps according to the exemplary embodiments of FIGS. 1 and 14.
Figure 18:
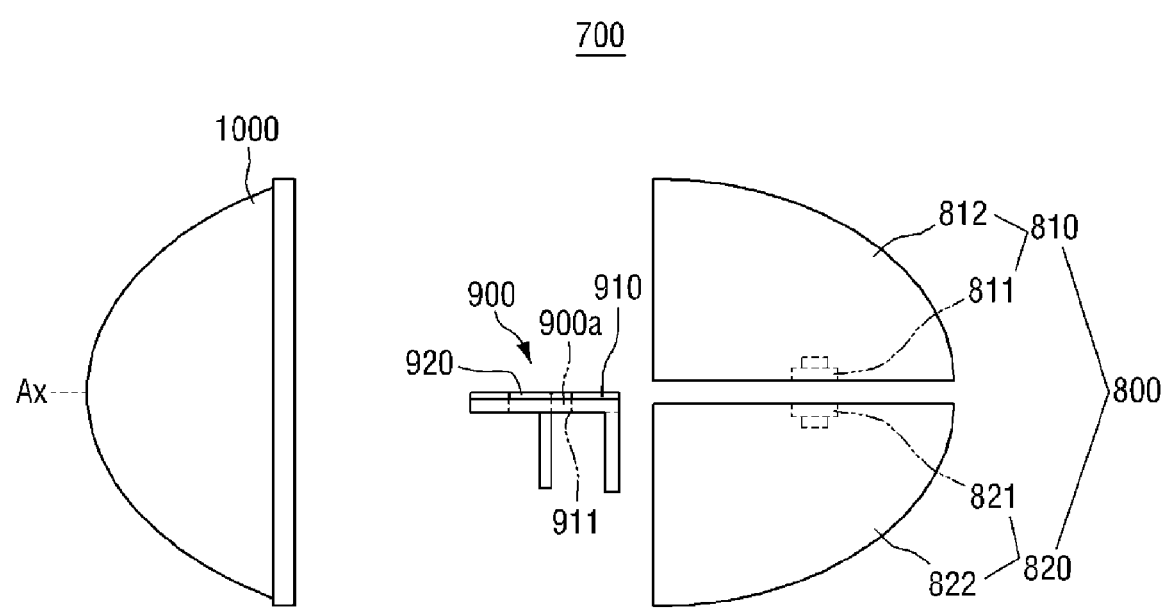
FIG. 18 is an exemplary embodiment of a side view illustrating the first lamp unit of FIG. 17.
Figure 19:
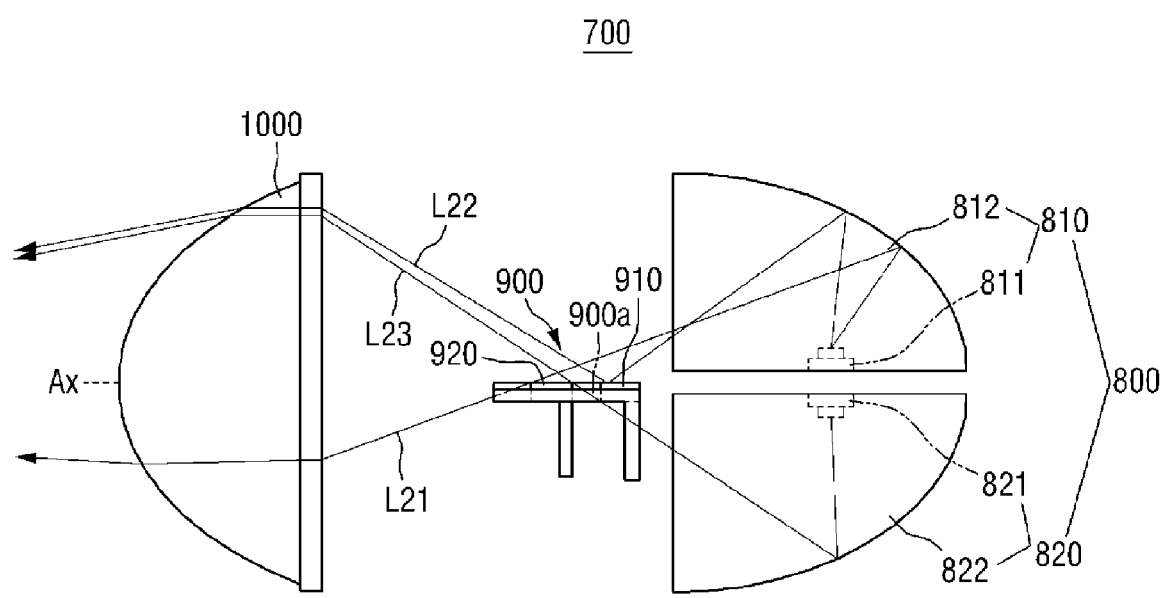
FIG. 19 is an exemplary embodiment of a side view illustrating how to form a low beam pattern with the first lamp unit of FIG. 17.
Figure 20:
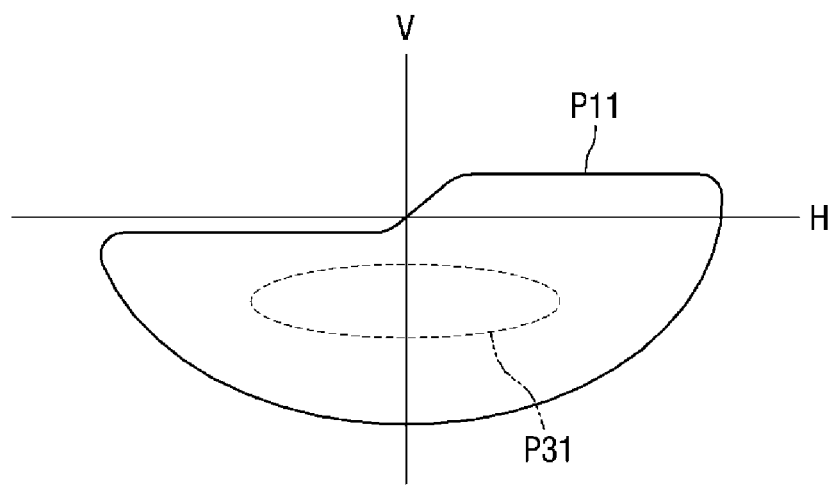
FIG. 20 is an exemplary embodiment of a schematic view illustrating a low beam pattern formed by the first lamp unit of FIG. 17.

FIG. 17 is an exemplary embodiment of a perspective view illustrating another first lamp unit that may be applied to the lamps according to the exemplary embodiments of FIGS. 1 and 14. FIG. 18 is an exemplary embodiment of a side view illustrating the first lamp unit of FIG. 17. FIG. 19 is an exemplary embodiment of a side view illustrating how to form a low beam pattern with the first lamp unit of FIG. 17. FIG. 20 is an exemplary embodiment of a schematic view illustrating a low beam pattern formed by the first lamp unit of FIG. 17. Referring to FIGS. 17 to 20, the lamp 1 according to the exemplary embodiment of FIG. 1 or 14 may include a plurality of lamp units 700. The plurality of lamp units 700 may have the same structure as the plurality of lamp units 210 and 220 except for the structure of shields 900, and thus will hereinafter be described, focusing mainly on differences with the plurality of lamp units 210 and 220. Each of the plurality of lamp units 700 may include a plurality of light-emitting units 800, a shield 900 and a lens 1000. The plurality of light-emitting units 800 may include first and second light-emitting units 810 and 820, which may be disposed in different directions along an optical axis Ax, (e.g., above and below). Light may be generated by at least one of the plurality of light-emitting units 800 depending on the type of a beam pattern to be formed.

For example, to form a low beam pattern, light may be generated by the first light-emitting unit 810, disposed above the optical axis Ax, and in order to form a high beam pattern, light may be generated by all the plurality of light-emitting units 800. In other words, light may be generated by the plurality of light-emitting units 800 regardless of the type of a beam pattern to be formed. Further, the plurality of light-emitting units 800 may be configured to form different beam patterns or one of the plurality of light-emitting units 800 may be configured to form a beam pattern that reinforces part of a beam pattern formed by the other light-emitting unit(s) 800.

The first and second light-emitting units 810 and 820 may include light sources 811 and 821, respectively, and reflectors 812 and 822, respectively. The reflectors 812 and 822 may be disposed such that the reflective surfaces positioned on the interior of the reflectors 812 and 822 may respectively face the light-emitting surfaces of the light sources 811 and 821.

The shield 900 may have the shape of a plate, may be disposed at the front of, and between, the plurality of light-emitting units 800, and may form a beam pattern by obstructing a portion of the light generated by at least one of the plurality of light-emitting units 800. In order to form a cut-off line in a beam pattern, the shield 900 may be formed to have a stepped portion on at least part of a surface thereof that obstructs a portion of the light generated by at least one of the plurality of light-emitting units 800. A reflective layer (not illustrated) may be formed on the surface of the shield 900 that obstructs a portion of the light generated by the plurality of light-emitting units 800, to reflect the obstructed light to travel toward the lens 1000. The reflective layer may be formed by a deposition process.

The shield 900 may include a fixed shield 910 and a movable shield 920, which can be rotated to a predetermined angle relative to the fixed shield 910. In other words, the fixed shield 910 may have a fixed location, and the movable shield 920 may be actuated to open or close a portion of the shield 900 positioned at the front of the fixed shield 910. An incised groove 911 having a predetermined size may be formed at the center of the front of the fixed shield 910, and the movable shield 920 may be rotated to open or shut the incised groove 911. In particular, the movable shield 920 may be configured to be rotated to close the entire incised groove 911 of the fixed shield 910 or may be configured to be rotated to close part of the incised groove 911 disposed at the front end of the incised groove 911, while leaving a light transmission aperture 900*a* at the rear end of the incised groove 911. The light transmission aperture 900*a* may be formed near a focal point at the rear of the lens 1000.

In other words, in response to the movable shield 920 being rotated to close the incised groove 911 of the fixed shield 910, part of the incised groove 911 not closed by the movable shield 920 between the movable shield 920 and the fixed shield 910 may form the light transmission aperture 900*a*. An aperture, (i.e., the light transmission aperture 900*a*), may be formed by a portion of the incised groove 911 not closed by the movable shield 920. In other words, a groove, a transmissive film capable of transmitting light therethrough or a combination thereof may be formed instead of the light transmission aperture 900*a*.

As illustrated in FIGS. 17 to 19, the movable shield 920 may close the incised groove 911 of the fixed shield 910, as illustrated in FIG. 20, a low beam pattern P11 may thereafter be formed. In particular, in response to the movable shield 920 closing the incised groove 911, light L21 generated by the first light-emitting unit 810 may pass through the shield 900. The light L22 also generated by the light-emitting unit 810 may be reflected by the shield 900 and may thus travel toward the top of the lens 1000, thereby forming the low beam pattern P11. Light L23 generated by the second light-emitting unit 820 may pass through the light transmission aperture 900*a* and may thus form a reinforcing beam pattern P31 that reinforces part of the low beam pattern P11.

Figure 21:
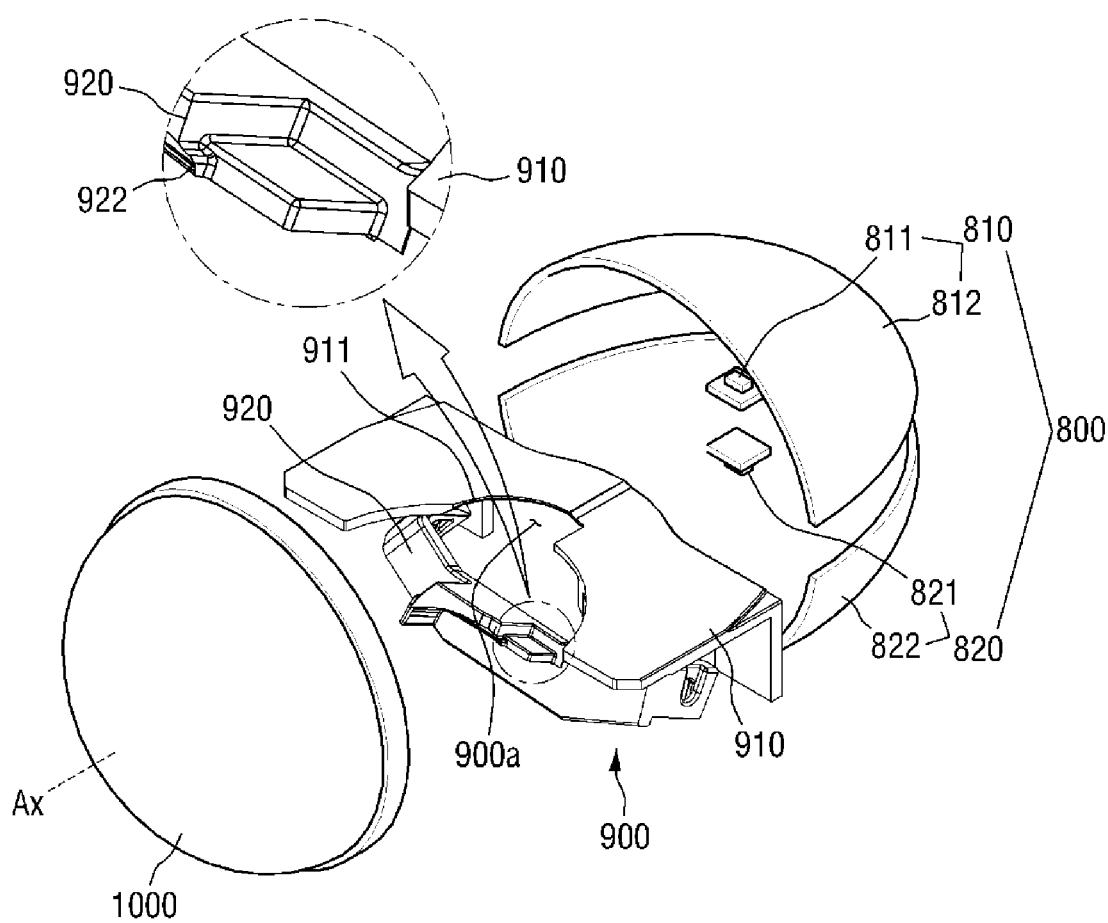
FIG. 21 is an exemplary embodiment of a perspective view illustrating the first lamp unit of FIG. 17 with a movable shield of a shield thereof in an actuated state.
Figure 22:
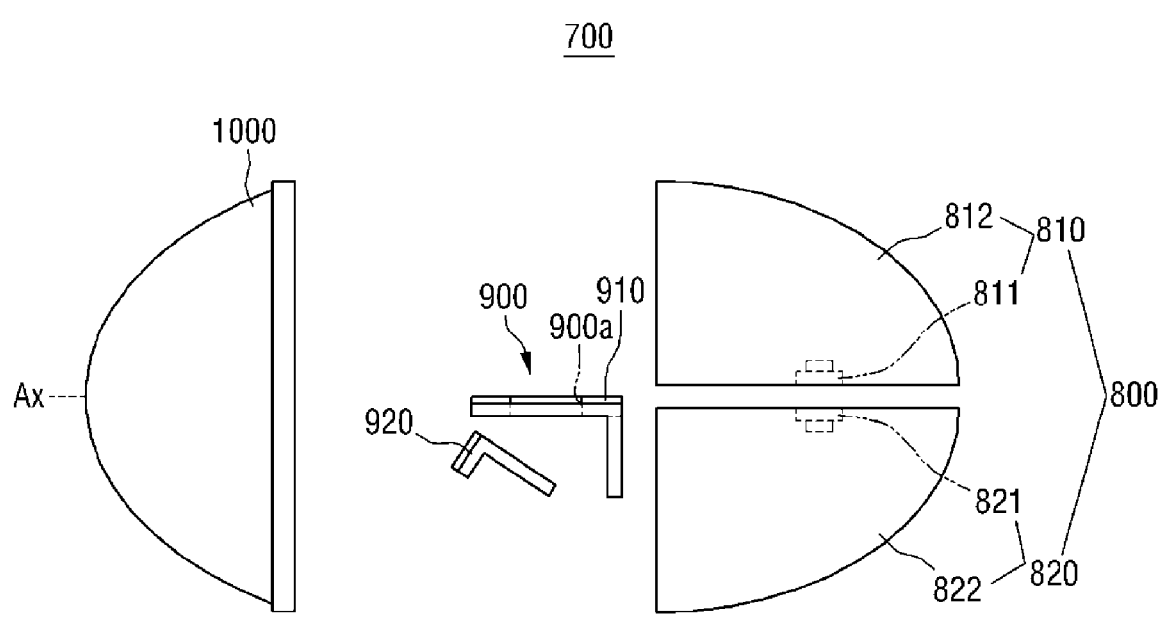
FIG. 22 is an exemplary embodiment of a side view illustrating the first lamp unit of FIG. 21.
Figure 23:
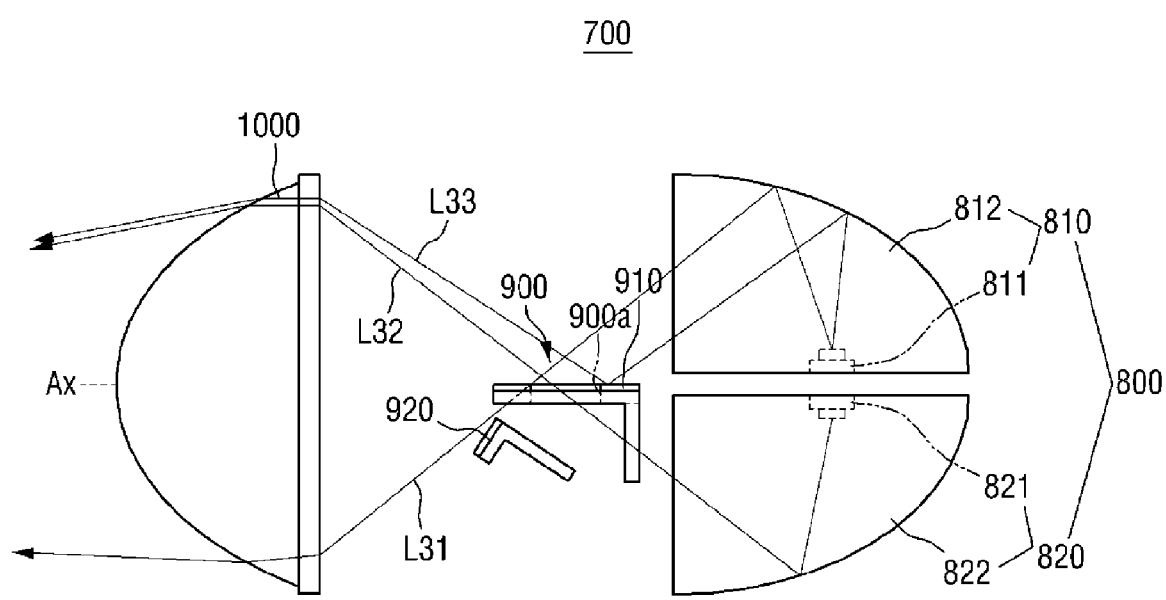
FIG. 23 is an exemplary embodiment of a side view illustrating the formation of a high beam pattern by the first lamp unit of FIG. 22.
Figure 24:
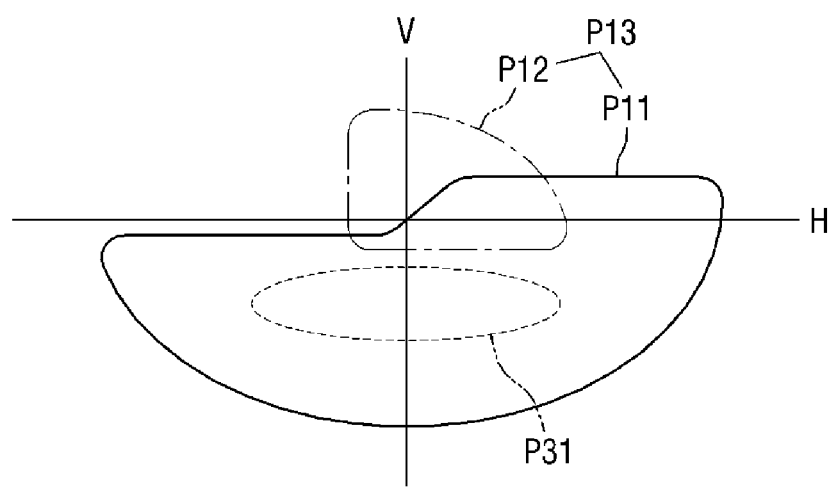
FIG. 24 is an exemplary embodiment of a schematic view illustrating a high beam pattern formed by the first lamp unit of FIG. 17.
Figure 25:
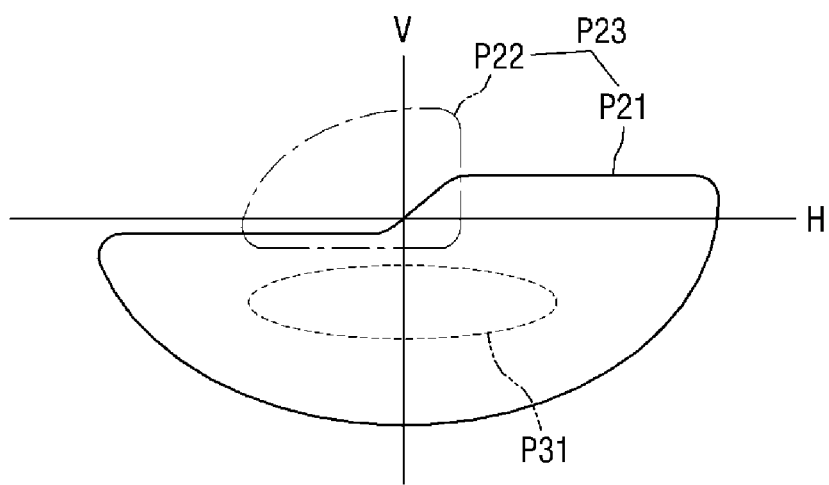
FIG. 25 is an exemplary embodiment of a schematic view illustrating a high beam pattern formed by another second lamp unit that can be applied to the lamps according to the exemplary embodiments of FIGS. 1 and 14.

FIG. 21 is an exemplary embodiment of a perspective view illustrating the first lamp unit of FIG. 17 with a movable shield of a shield thereof in an actuated state, and FIG. 22 is an exemplary embodiment of a side view illustrating the first lamp unit of FIG. 21. FIG. 23 is an exemplary embodiment of a side view illustrating the formation of a high beam pattern by the first lamp unit of FIG. 22. FIG. 24 is an exemplary embodiment of a schematic view illustrating a high beam pattern formed by the first lamp unit of FIG. 17. FIG. 25 is an exemplary embodiment of a schematic view illustrating a high beam pattern formed by another second lamp unit that may be applied to the lamps according to the exemplary embodiments of FIGS. 1 and 14.

Referring to FIGS. 21 to 25, in response to the movable shield 920 of the shield 900 being actuated and rotated to open the front end of the incised groove 911 of the fixed shield 910, a high beam pattern P13 may be formed, as illustrated in FIG. 24. In other words, as illustrated in FIGS. 21 to 24, in response to the movable shield 920 being rotated to open the incised groove 911 of the fixed shield 910, light L31 generated by the first light-emitting unit 810 may pass through the shield 900, and light L33 also generated by the first light-emitting unit 810 may be reflected by the shield 900 and may thus travel toward the top of the lens 1000, thereby forming a low beam pattern P11.

Light (not illustrated) generated by the second light-emitting unit 820 may pass through the light transmission aperture 900*a* and may form a reinforcing beam pattern P31 that may reinforce a portion of the low beam pattern P11. Light L32 generated by the second light-emitting unit 820 and may pass through the light transmission aperture 900*a* and may thus form a beam pattern P12 for a long-range visibility. The beam pattern P12 may form a high beam pattern P13, capable of securing a short-range visibility, together with the low beam pattern P11. The beam pattern P12 may have a portion corresponding to a direction of the interior of the vehicle removed, as illustrated in FIG. 24, because the incised groove 911 may be formed to be asymmetrical with respect to the centerline of the shield 900.

Figure 26:
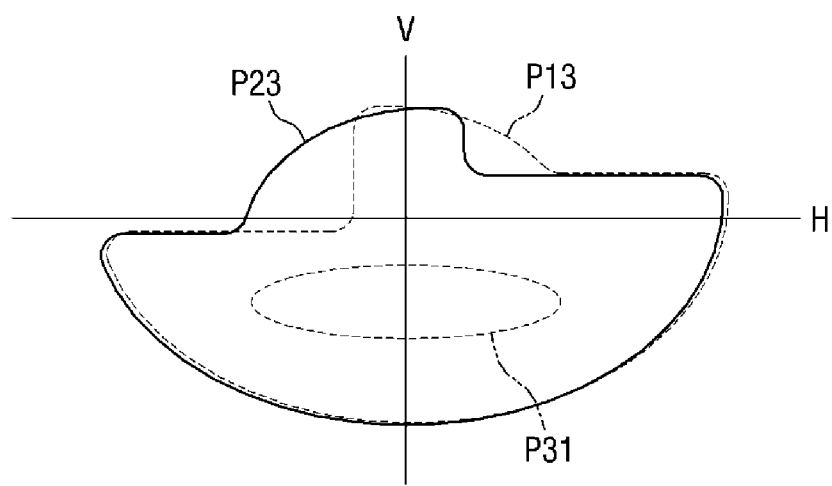
FIG. 26 is an exemplary embodiment of a schematic view illustrating high beam patterns formed by another first lamp unit and another second lamp unit that can be applied to the lamps according to the exemplary embodiments of FIGS. 1 and 14.

As described above, the plurality of lamp units 700, (i.e., a pair of first and second lamp units 700), may be provided on alternate sides of the vehicle. As illustrated in an exemplary embodiment FIG. 25, the second lamp unit 700, disposed opposite to the first lamp unit 700 that has been described above, may form a beam pattern P22 for a long-range visibility. The beam pattern P22 may have a portion removed, and the removed part of the beam pattern P22 may be on the opposite side of the removed part of the beam pattern P12 formed by the first lamp unit 700. The beam pattern P22 may form a high beam pattern P23, capable of securing a short-range visibility, together with the low beam pattern P21. High beam patterns P13 and P23 as illustrated in FIG. 26 may be formed by combining beam patterns formed by the plurality of lamp units 700.

In particular, as described above, in response to the movable shield 920 of the shield 900 closing the front end of the incised groove 911, as illustrated in FIGS. 17 to 19, light generated by the first light-emitting unit 810 may be partially obstructed by the fixed shield 910 and may form the low beam patterns P11 and P21, and light generated by the second light-emitting unit 820 may form the beam patterns P12 and P22 for a long-range visibility. As a result, the high beam patterns P13 and P23 may be formed. The light L22 and the light L33 obstructed by the fixed shield 910 may be reflected toward the top of the lens 1000, thereby improving a short-range visibility.

The fixed shield 910 may be fixedly installed and the movable shield 920 at the center of the front of the shield 900 may be actuated to change beam patterns. Therefore, it is possible to secure a short-range visibility by preventing an unnecessary part from being generated in a high beam pattern. Additionally, the light may be reflected and recycled that otherwise may have been used to form the unnecessary part of the high beam pattern, compared to a case of forming a high beam pattern by changing the position of the entire shield 900. Further, since only the position of the moveable shield 920 is changed by a structure, rather than the position of the entire shield 900, the amount of space required may be reduced, compared to the case of forming a high beam pattern by changing the position of the entire shield 900.

Figure 27:
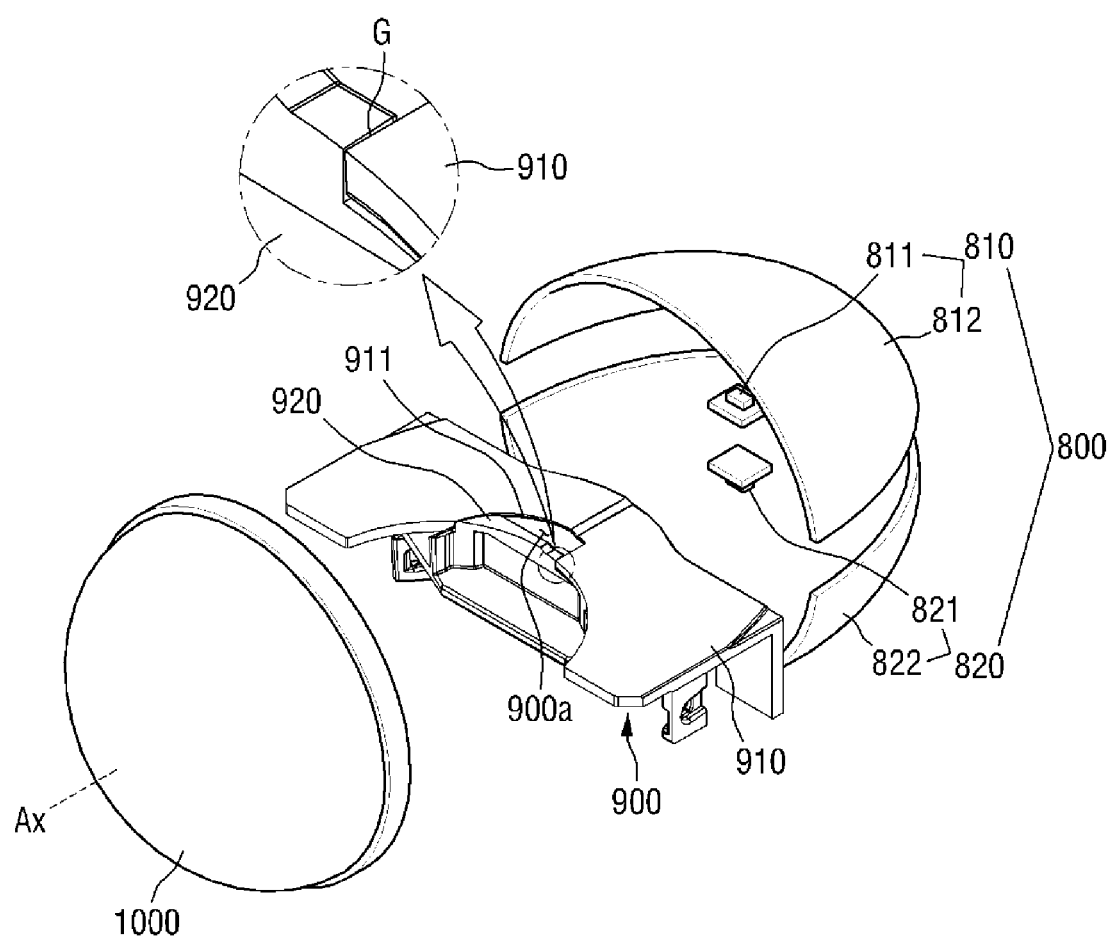
FIG. 27 is an exemplary embodiment of a perspective view illustrating a gap that may be formed in response to the shield of a related-art lamp for a vehicle closed.

Moreover, the shield 900 may include the fixed shield 910 and the movable shield 920, and the movable shield 920 may be rotated to open or close the incised groove 911 of the fixed shield 910. In response to the movable shield 920 being rotated toward the fixed shield 910 to close the front end of the incised groove 911, a minute gap G may be formed between one end of the movable shield 920 and one end of the fixed shield 910, as illustrated in FIG. 27.

Figure 28:
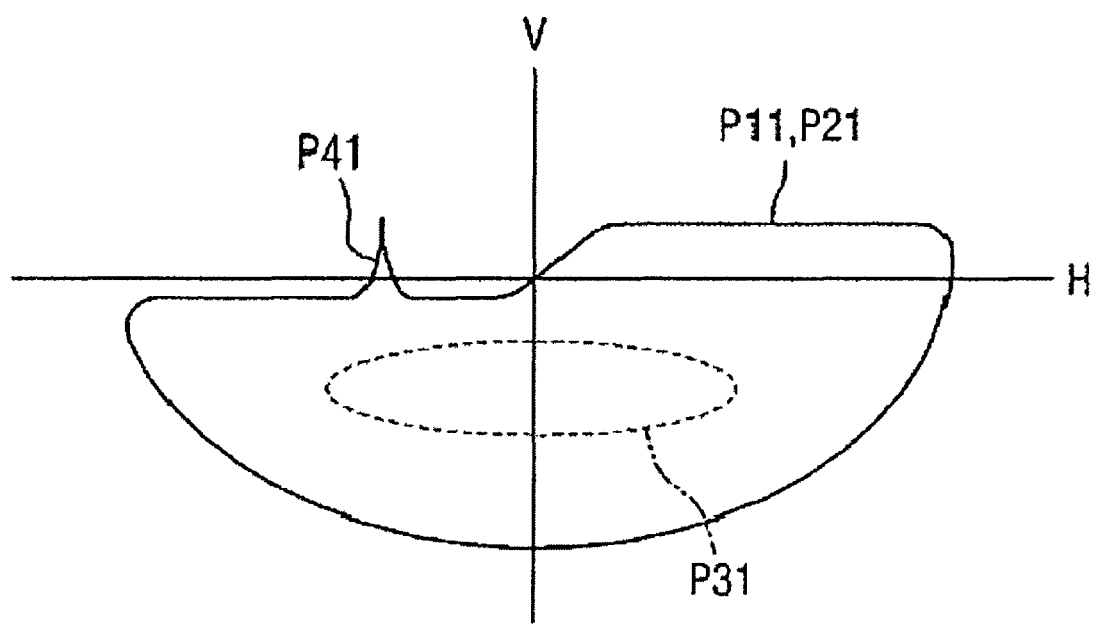
FIG. 28 is an exemplary embodiment of a schematic view illustrating a low beam pattern formed with a splatter of light caused by the gap of FIG. 27.

During the formation of a low beam pattern P11 as illustrated in an exemplary embodiment as shown in FIG. 28, light may pass through the gap G, and as a result, a splatter of light may occur and may cause glare to the driver of a preceding vehicle or an oncoming vehicle. To address this problem, a cover 922 may be formed to protrude by a predetermined length from the front end of the movable shield 920, as illustrated in FIGS. 17 and 21. The cover 922 may be configured to completely cover the gap G between the movable shield 920 and the fixed shield 910 when the movable shield 920 closes the front end of the incised groove 911. Covering the gap G between the movable shield 920 and the fixed shield 910 by the cover 922, may preclude splatter of light, such as light irradiated to an undesirable area, from occurring during the formation of a low beam pattern P11, as illustrated in FIG. 20. The restriction may prevent glare to the driver of a preceding vehicle or an oncoming vehicle.

The plurality of lamp units 700 may form a lamp for a vehicle along with the vehicle position sensing unit 100, the shield actuating unit 300, the optical axis adjustment unit 400 and the control unit 500 according to the exemplary embodiment of FIG. 1 or 14. Each of the plurality of lamp units 700 may form a shadow zone according to the position of a forward vehicle by changing beam patterns or changing a direction of irradiation of light through the opening or closing of a portion of the shield 900 thereof, and may thus prevent glare to the driver of the forward vehicle. The structure and operating principles of the plurality of lamp units 700 for forming a shadow zone are similar to the of the plurality of lamp units 210 and 220 according to the exemplary embodiment of FIG. 1 or 14, and thus, detailed descriptions thereof will be omitted.

A lamp for a vehicle, having the plurality of lamp units 700, like the lamp 1 according to the exemplary embodiment of FIG. 14, may further include a traveling direction sensing unit 600 that may sense the traveling direction of the vehicle. The operating principles of the lamp for a vehicle, having the plurality of lamp units 700 and the traveling direction sensing unit 600, may be similar to those of the lamp 1 according to the exemplary embodiment of FIG. 14, and thus, detailed descriptions thereof will be omitted.

While this disclosure has been described in connection with what is presently considered to be exemplary embodiments, it is to be understood that the present disclosure is not limited to the disclosed exemplary embodiments but on the contrary, is intended to cover various modifications and equivalent arrangements included within the spirit and scope of the accompanying claims. In addition, it is to be considered that all of these modifications and alterations fall within the scope of the present disclosure.

What is claimed is:

1. A lamp for a vehicle, comprising:
    a vehicle position sensing unit sensing a position of a forward vehicle;
    a plurality of lamp units changing beam patterns by opening or closing a portion of a shield having a plate-shaped;
    a shield actuating unit actuating the shield to open or close the portion of the shield;
    an optical axis adjustment unit changing a direction of irradiation of light by adjusting an optical axis of at least one of the plurality of lamp units; and
    a control unit forming a shadow zone by controlling at least one of the shield actuating unit and the optical axis adjustment unit according to the sensed position of the forward vehicle,
    wherein the shield includes a fixed shield, fixedly installed, and a movable shield, actuated by the shield actuating unit to open or close the portion of the shield, and
    wherein the shield actuating unit rotates the movable shield toward a front of the shield.

2. The lamp of claim 1, wherein the portion of the shield extends from a center of a front of the shield to a rear of the shield.

3. The lamp of claim 1, wherein the shield forms a low beam pattern in response to the portion of the shield being closed, and forms the low beam pattern and a beam pattern for a long-range visibility in response to the portion of the shield being opened.

4. The lamp of claim 3, wherein the portion of the shield is asymmetrical with respect to a centerline of the shield wherein a portion of the beam pattern for a long-range visibility corresponding to a direction of an interior of the vehicle can be removed.

5. The lamp of claim 3, wherein the control unit forms the shadow zone by controlling the optical axis adjustment unit with the portion of the shield opened in response to the forward vehicle being within a predetermined angle from a centerline of the vehicle, and by controlling the shield actuating unit with the portion of the shield opened in response to the forward vehicle being beyond the predetermined angle from the centerline of the vehicle.

6. The lamp of claim 1, wherein the optical axis adjustment unit rotates at least one of the plurality of lamp units in a widthwise direction of the vehicle.

7. The lamp of claim 1, wherein each of the plurality of lamp units forms a beam pattern for a long-range visibility in response to the portion of the shield thereof being opened, and the beam patterns respectively formed by the plurality of lamp units overlap one another at a center thereof.

8. The lamp of claim 1, further comprising:
    a traveling direction sensing unit sensing a traveling direction of the vehicle,
    wherein the optical axis adjustment unit adjusts the direction of irradiation of light of at least one of the plurality of lamp units to the sensed traveling direction of the vehicle.

9. The lamp of claim 1, wherein the control unit forms the shadow zone based on a forward vehicle at an outermost left or right side of the vehicle.

10. A lamp for a vehicle, comprising:
    a plurality of light-emitting units disposed in different directions from an optical axis;
    a lens disposed at the front of the plurality of light-emitting units and transmitting light therethrough; and a shield including a fixed shield, which is fixedly installed in a predetermined area between the plurality of light-emitting units and the lens, and a movable shield, which selectively opens or closes an incised groove formed at the front of the fixed shield.

11. The lamp of claim 10, wherein a cover is formed at an end of the movable shield to cover a gap between the movable shield and the fixed shield in response to the movable shield closing the incised groove of the fixed shield.

12. The lamp of claim 10, wherein the movable shield closes part of the incised groove at a front end of the fixed shield, while leaving a portion of the incised groove in the form of a light transmission aperture.

13. The lamp of claim 12, wherein in response to the movable shield closing the incised groove of the fixed shield, light passing through the light transmission groove forms a reinforcing beam pattern.

14. A controlling method of a lamp for a vehicle, comprising:
    forming by a controller a low beam pattern and a beam pattern for a long-range visibility with the use of a plurality of lamp units, each of the plurality of lamp units including a shield having a portion to be opened or closed;
    sensing by a controller a position of a forward vehicle; and
    forming by a controller a shadow zone by closing the portion of the shield or changing a direction of irradiation of light of at least one of the plurality of lamp units according to the sensed position of the forward vehicle,
    wherein the shield includes a fixed shield, fixedly installed, and a movable shield, actuated by a shield actuating unit to open or close the portion of the shield, and
    wherein the shield actuating unit rotates the movable shield toward a front of the shield.

15. The controlling method of claim 14, wherein the forming by the controller the beam pattern for a long-range visibility, comprises opening the portion of the shield.

16. The controlling method of claim 15, wherein the forming by the controller the beam pattern for a long-range visibility, comprises removing part of the beam pattern for a long-range visibility with the use of the portion of the shield that is asymmetrical with respect to a centerline of the shield.

17. The controlling method of claim 14, wherein the forming by the controller the shadow zone, comprises:
    changing the direction of irradiation of light of at least one of the plurality of light-emitting units in response to the forward vehicle being within a predetermined angle from a centerline of the vehicle; and
    closing the portion of the shield in response to the forward vehicle being beyond the predetermined angle from the centerline of the vehicle.

18. The controlling method of claim 14, further comprising:
    sensing by the controller a traveling direction of the vehicle,
    wherein the forming the shadow zone, comprises:
    changing the direction of irradiation of light of at least one of the plurality of light-emitting units to the sensed traveling direction of the vehicle; and
    forming by the controller the shadow zone based on a forward vehicle on an outermost left or right side of the vehicle.

* * * * *